(12) United States Patent
Wallace et al.

(10) Patent No.: US 7,953,047 B2
(45) Date of Patent: May 31, 2011

(54) PARSER FOR MULTIPLE DATA STREAMS IN A COMMUNICATION SYSTEM

(75) Inventors: Mark S. Wallace, Bedford, MA (US); John W. Ketchum, Harvard, MA (US)

(73) Assignee: Qualcomm Incorporated, San Diego, CA (US)

( * ) Notice: Subject to any disclaimer, the term of this patent is extended or adjusted under 35 U.S.C. 154(b) by 1094 days.

(21) Appl. No.: 11/042,921

(22) Filed: Jan. 24, 2005

(65) Prior Publication Data
US 2006/0187815 A1    Aug. 24, 2006

(51) Int. Cl.
*H04B 7/216* (2006.01)
*H04J 13/00* (2006.01)
*H04J 3/07* (2006.01)
*H04B 3/46* (2006.01)

(52) U.S. Cl. ........ 370/335; 370/342; 370/479; 370/506; 375/224

(58) Field of Classification Search .................. 370/335, 370/342, 479, 506; 375/224
See application file for complete search history.

(56) References Cited

U.S. PATENT DOCUMENTS

| | | | | |
|---|---|---|---|---|
| 5,909,454 | A * | 6/1999 | Schmidt | 714/790 |
| 6,131,180 | A * | 10/2000 | Ramesh | 714/790 |
| 6,981,202 | B2 | 12/2005 | Mikkola et al. | |
| 2001/0034782 | A1 | 10/2001 | Kinkade | |
| 2001/0034872 | A1 * | 10/2001 | Smallcomb | 714/786 |
| 2002/0101915 | A1 * | 8/2002 | Zhang et al. | 375/222 |
| 2002/0152445 | A1 * | 10/2002 | Kim et al. | 714/786 |
| 2004/0081103 | A1 * | 4/2004 | Sebire | 370/253 |
| 2004/0097215 | A1 * | 5/2004 | Abe et al. | 455/403 |
| 2005/0025188 | A1 | 2/2005 | Numakura et al. | |
| 2005/0058098 | A1 * | 3/2005 | Klein et al. | 370/329 |

FOREIGN PATENT DOCUMENTS

EP    1231737    8/2002

(Continued)

OTHER PUBLICATIONS

Written Opinion—PCT/US06/002498—International Search Authority. European Patent Office—Jun. 7, 2006.

(Continued)

*Primary Examiner* — Daniel J Ryman
*Assistant Examiner* — John Blanton
(74) *Attorney, Agent, or Firm* — Qualcomm Patent Group; James Hunt Yancey, Jr.; Thien T. Nguyen (57) ABSTRACT

Techniques to parse data into multiple (M) streams with selectable data rates are described. The modulation scheme and code rate for each stream are determined based on the data rate selected for that stream. The modulation schemes and code rates for all M streams are used to determine a parse cycle and the number of puncture cycles for each stream in the parse cycle. A sequence of puncture cycles is formed for the M streams such that the puncture cycle(s) for each stream are distributed as evenly as possible across the sequence. An encoder encodes traffic data in accordance with a base code (e.g., a rate 1/2 binary convolutional code) and generates code bits. A parser then parses the code bits into the M streams based on the sequence of puncture cycles, one puncture cycle at a time and in the order indicated by the sequence.

42 Claims, 7 Drawing Sheets

FOREIGN PATENT DOCUMENTS

| | | |
|---|---|---|
| EP | 1388992 A1 | 2/2004 |
| JP | 6268660 | 9/1994 |
| JP | 07221768 | 8/1995 |
| JP | 10303934 | 11/1998 |
| KR | 1020020065866 | 8/2002 |
| KR | 1020040067470 | 7/2004 |
| RU | 2104583 | 2/1998 |
| WO | WO 96/23360 * | 8/1996 |
| WO | WO0110046 A2 | 2/2001 |

OTHER PUBLICATIONS

International Preliminary Report on Patentability—PCT/US06/002498—The International Bureau of WIPO, Geneva, Switzerland—Jul. 24, 2007.

International Search Report—PCT/US06/002498— International Search Authority, European Patent Office—Jun. 7, 2006.

* cited by examiner

PARSER FOR MULTIPLE DATA STREAMS IN A COMMUNICATION SYSTEM

BACKGROUND

I. Field

The present invention relates generally to communication, and more specifically to techniques for parsing (or demultiplexing) data into multiple streams in a communication system.

II. Background

A multiple-input multiple-output (MIMO) communication system employs multiple (T) transmit antennas at a transmitting entity and multiple (R) receive antennas at a receiving entity for data transmission. A MIMO channel formed by the T transmit antennas and the R receive antennas may be decomposed into S spatial channels, where $S \leq \min \{T, R\}$. The S spatial channels may be used to transmit data in a manner to achieve higher overall throughput and/or greater reliability.

The S spatial channels may experience different channel conditions (e.g., different fading, multipath, and interference effects) and may achieve different signal-to-noise-and-interference ratios (SNRs). The SNR of each spatial channel determines its transmission capability, which is typically quantified by a particular data rate that may be reliably transmitted on the spatial channel. If the SNR varies from spatial channel to spatial channel, then the supported data rate also varies from channel to channel. Furthermore, if the channel conditions vary with time, then the data rates supported by the spatial channels also vary with time.

A major challenge in a coded MIMO system is parsing data into multiple streams in a manner such that good performance can be achieved for all streams. This parsing is complicated if different data rates can be used for different streams and these streams can carry different numbers of bits in a given time interval. The parsing is further complicated if different data rates are associated with different puncture patterns, as described below.

There is therefore a need in the art for techniques to parse data into multiple streams with different data rates.

SUMMARY

Techniques to parse data into multiple streams with individually selectable data rates are described herein. Different data rates may be achieved with different combinations of modulation scheme and code rate. Different code rates may be obtained by using a base code to generate a fixed number of code bits and then puncturing (or deleting) as many code bits as needed to achieve the desired code rates.

Each code rate is then associated with a specific puncture pattern used to puncture the code bits.

At a transmitting entity, an encoder encodes traffic data in accordance with the base code (e.g., a rate 1/2 binary convolutional code) and generates code bits. A parser then parses the code bits into multiple (M) streams based on a parsing sequence that indicates the order for parsing the code bits into the M streams. The parsing sequence is formed to (1) achieve the shortest possible runs of code bits for each stream and (2) distribute the runs of code bits evenly or approximately evenly across the M streams. The shortest possible runs for each stream are dictated by coding performance and are often determined by the puncture pattern used for that stream.

In an embodiment for parsing data, the modulation scheme and the code rate for each stream are initially determined based on the data rate selected for that stream. The modulation schemes and code rates for all M streams are used to determine a parse cycle and the number of puncture cycles for each stream in the parse cycle. A parse cycle is a window over which parsing is performed, and a puncture cycle is one instant of a puncture pattern. A sequence of puncture cycles is formed for the M streams such that, for each stream with multiple puncture cycles, the multiple puncture cycles for that stream are distributed evenly or approximately evenly across the sequence. Several schemes for distributing the puncture cycles for each stream across the sequence are described below. The code bits from the encoder are then parsed into the M streams based on the sequence of puncture cycles, one puncture cycle at a time and in the order indicated by the sequence. The code bits in each stream are further punctured based on the puncture pattern for that stream. The M streams are then processed (e.g., interleaved, symbol mapped, and so on) for transmission via multiple transmission channels (e.g., multiple spatial channels).

A receiving entity performs reassembly of multiple streams in a manner complementary to the parsing performed by the transmitting entity. Various aspects and embodiments of the invention are described in further detail below.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The parsing techniques described herein may be used for various wireless and wireline communication systems capable of transmitting multiple data streams simultaneously. For example, these techniques may be used for a MIMO system, an orthogonal frequency division multiplexing (OFDM) system, a MIMO system that utilizes OFDM (i.e., MIMO-OFDM system), and so on. OFDM is a multi-carrier modulation technique that effectively partitions the overall system bandwidth into multiple orthogonal frequency subbands, which are also called tones, subcarriers, bins, and frequency channels. With OFDM, each subband is associated with a respective subcarrier that may be modulated with data. For clarity, the parsing techniques are described below for an exemplary MIMO system.

Figure 1:
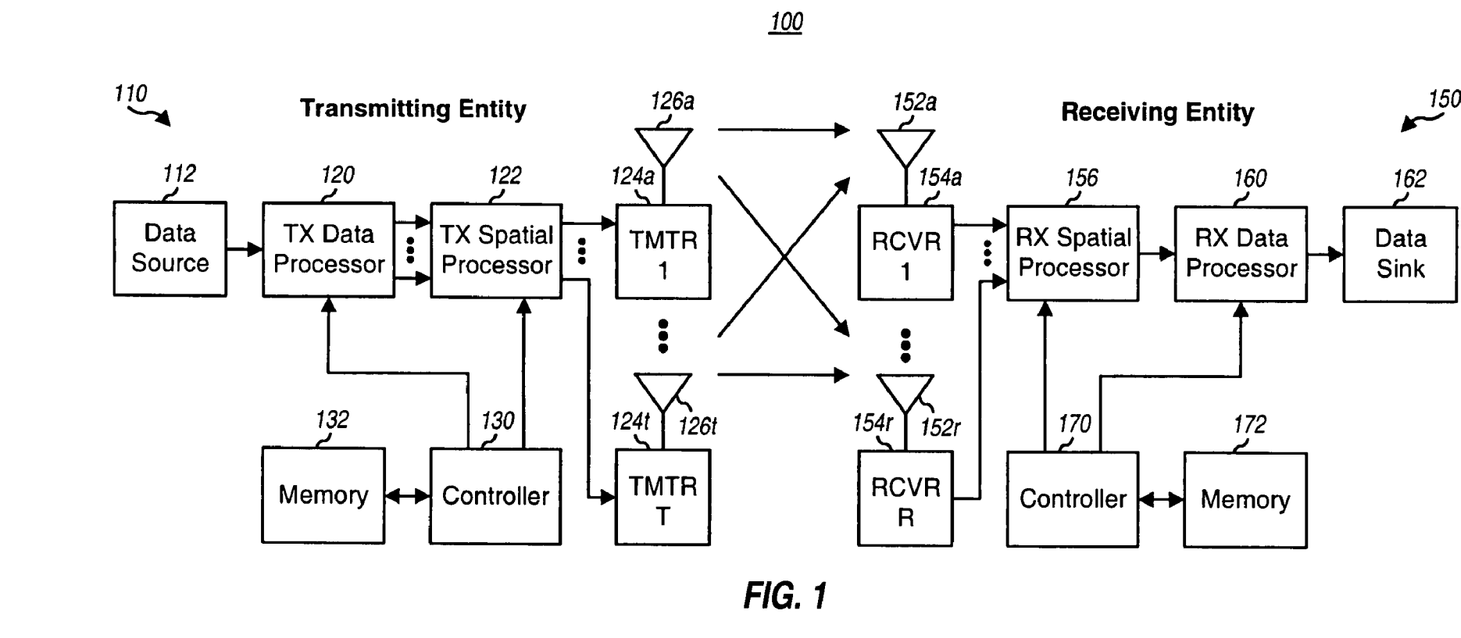
FIG. 1 shows a block diagram of a transmitting entity and a receiving entity.

FIG. 1 shows a block diagram of a transmitting entity 110 and a receiving entity 150 in a MIMO system 100. Transmitting entity 110 may be an access point or a user terminal. Receiving entity 150 may also be an access point or a user terminal.

At transmitting entity 110, a TX data processor 120 receives traffic data from a data source 112, encodes the traffic data to generate code bits, and parses the code bits into multiple (M) streams. TX data processor 120 further processes (e.g., punctures, interleaves, and symbol maps) each stream of code bits to generate a corresponding stream of modulation symbols. A TX spatial processor 122 receives M streams of modulation symbols from TX data processor 120, multiplexes in pilot symbols, performs spatial processing as appropriate, and provides T streams of transmit symbols to T transmitter units (TMTR) 124a through 124t. Each transmitter unit 124 performs OFDM modulation (if applicable) to generate data chips, and further processes (e.g., converts to analog, amplifies, filters, and frequency upconverts) its data chips to generate a modulated signal. Transmitter units 124a through 124t provide T modulated signals for transmission from T antennas 126a through 126t, respectively.

At receiving entity 150, R antennas 152a through 152r receive the T transmitted signals, and each antenna 152 provides a received signal to a respective receiver unit (RCVR) 154. Each receiver unit 154 processes its received signal and provides a stream of received symbols to an RX spatial processor 156. RX spatial processor 156 performs receiver spatial processing (or spatial matched filtering) on the received symbols from all R receiver units 154 and provides M streams of detected symbols, which are estimates of the modulation symbols sent by transmitting entity 110. An RX data processor 160 then processes the M streams of detected symbols and provides decoded data to a data sink 162.

Controllers 130 and 170 control the operation of the processing units at transmitting entity 110 and receiving entity 150, respectively. Memory units 132 and 172 store data and/or program codes used by controllers 130 and 170, respectively.

Figure 2:
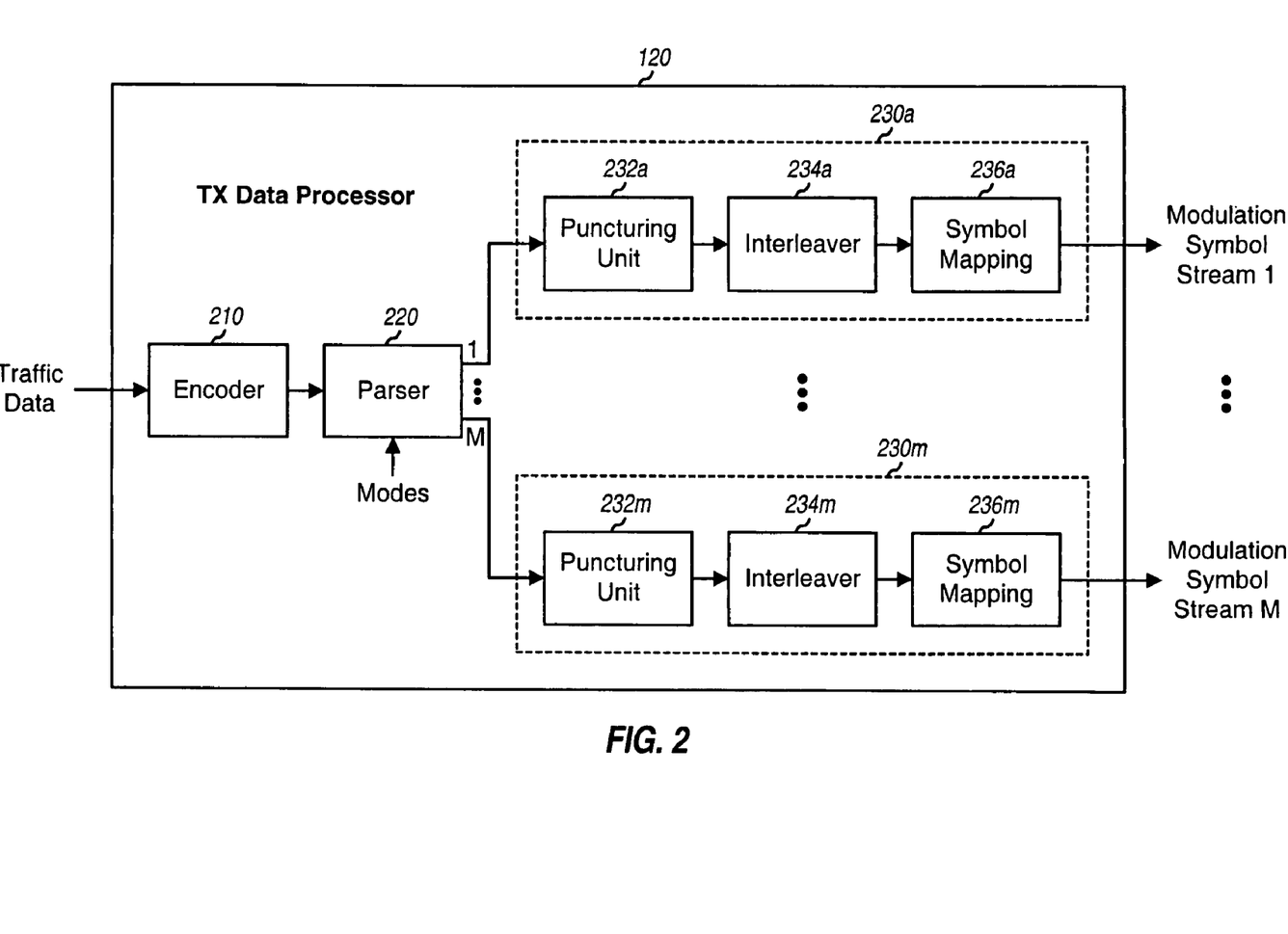
FIG. 2 shows a transmit (TX) data processor at the transmitting entity.

FIG. 2 shows a block diagram of an embodiment of TX data processor 120 at transmitting entity 110. Within TX data processor 120, an encoder 210 encodes traffic data in accordance with an encoding scheme and generates code bits. The encoding scheme may include a convolutional code, a Turbo code, a low density parity check (LDPC) code, a cyclic redundancy check (CRC) code, a block code, and so on, or a combination thereof. In an embodiment, encoder 210 implements a rate ½ binary convolutional encoder that generates two code bits for each data bit. A parser 220 receives the code bits from encoder 210 and parses the code bits into M streams, as described below.

M stream processors 230a through 230m receive the M streams of code bits from parser 220. Each stream processor 230 includes a puncturing unit 232, an interleaver 234, and a symbol mapping unit 236. Puncturing unit 232 punctures (or deletes) as many code bits in its stream as necessary to achieve the desired code rate for the stream. For example, if encoder 210 is a rate 1/2 convolutional encoder, then code rates greater than 1/2 may be obtained by deleting some of the code bits from encoder 210. Interleaver 234 interleaves (or reorders) the code bits from puncturing unit 232 based on an interleaving scheme. The interleaving provides time, frequency, and/or spatial diversity for the code bits. Symbol mapping unit 236 maps the interleaved bits in accordance with a modulation scheme and provides modulation symbols. The symbol mapping may be achieved by (1) grouping sets of B bits to form B-bit values, where $B \geq 1$, and (2) mapping each B-bit value to a point in a signal constellation corresponding to the modulation scheme. Each mapped signal point is a complex value and corresponds to a modulation symbol. M stream processors 230a through 230m provide M streams of modulation symbols to TX spatial processor 122. The encoding, parsing, puncturing, interleaving, and symbol mapping may be performed based on control signals provided by controller 130.

System 100 may support a set of modes for data transmission. Table 1 lists an exemplary set of 14 modes that are identified by mode indices 1 through 14. Each mode is associated with a particular data rate or spectral efficiency (Spec Eff), a particular code rate, and a particular modulation (Mod) scheme. In Table 1, BPSK denotes binary phase shift keying, QPSK denotes quadrature phase shift keying, and QAM denotes quadrature amplitude modulation. The data rate for each mode is determined by the code rate and the modulation scheme for that mode and may be given in units of data bits per modulation symbol. The number of code bits per modulation symbols (bits/sym) is also given for each mode in Table 1. The code rate and modulation scheme for each mode in Table 1 are for a specific design.

TABLE 1

| Mode Index | Spec Eff | Code Rate | Mod Scheme | Bits/Sym |
|---|---|---|---|---|
| 1 | 0.5 | 1/2 | BPSK | 1 |
| 2 | 0.75 | 3/4 | BPSK | 1 |
| 3 | 1.0 | 1/2 | QPSK | 2 |
| 4 | 1.5 | 3/4 | QPSK | 2 |
| 5 | 2.0 | 1/2 | 16-QAM | 4 |
| 6 | 2.5 | 5/8 | 16-QAM | 4 |
| 7 | 3.0 | 3/4 | 16-QAM | 4 |
| 8 | 3.5 | 7/12 | 64-QAM | 6 |
| 9 | 4.0 | 2/3 | 64-QAM | 6 |
| 10 | 4.5 | 3/4 | 64-QAM | 6 |
| 11 | 5.0 | 5/6 | 64-QAM | 6 |
| 12 | 5.0 | 5/8 | 256-QAM | 8 |
| 13 | 6.0 | 3/4 | 256-QAM | 8 |
| 14 | 7.0 | 7/8 | 256-QAM | 8 |

As shown in Table 1, seven different code rates are used for the 14 supported modes. Each code rate higher than rate 1/2 may be obtained by puncturing some of the rate-1/2 code bits from encoder 210 based on a specific puncture pattern. Table 2 lists exemplary puncture patterns for the seven different code rates given in Table 1 for a particular constraint length k=7 convolutional code. These puncture patterns provide good performance for this convolutional code and are identified based on computer simulation. Other puncture patterns may also be used for the supported code rates for this convolutional code and also for other convolutional codes of the same or different constraint length.

TABLE 2

| Code Rate | Puncture pattern | # Input Bits | # Output Bits |
|---|---|---|---|
| 1/2 | 11 | 2 | 2 |
| 7/12 | 11111110111110 | 14 | 12 |
| 5/8 | 1110111011 | 10 | 8 |
| 2/3 | 1110 | 4 | 3 |
| 3/4 | 111001 | 6 | 4 |
| 5/6 | 1110011001 | 10 | 6 |
| 7/8 | 11101010011001 | 14 | 8 |

For an m/n code rate, there are n code bits for every m data bits. Rate 1/2 convolutional encoder 210 generates 2m code bits for every m data bits. To obtain the code rate of m/n, puncturing unit 232 outputs n code bits for each set of 2m code bits from encoder 210. Thus, puncturing unit 232 deletes 2m-n code bits from each set of 2m code bits from encoder 210 to obtain the n code bits for code rate m/n. The code bits to be deleted from each set are denoted by the zeros ('0') in the puncture pattern. For example, to obtain a code rate of 7/12, two code bits are deleted from each set of 14 code bits from encoder 210, with the deleted bits being the 8-th and 14-th bits in the set, as denoted by the puncture pattern '11111110111110'. No puncturing is performed if the desired code rate is 1/2.

The mode selected for each stream determines the code rate for that stream, which in turn determines the puncture pattern for the stream. If different modes may be selected for different streams, then up to M different puncture patterns may be used for the M streams.

Parser 220 parses the code bits from encoder 210 into the M streams in a manner to achieve the following objectives:

Mix the code bits from encoder 210 across the M streams as much as possible so that the smallest possible run (or cluster) of code bits is sent to each stream.

Support different modes for the M streams.

Parser 220 performs parsing on a group of code bits from encoder 210. A parse cycle is the smallest window over which the parsing is performed and corresponds to one group of code bits from encoder 210. The parse cycle size (or the number of code bits in each group) is determined by the modes used for the M streams and is selected such that the same number of modulation symbols is generated for each of the M streams. As shown in FIG. 2, puncturing is performed after parsing in order to readily support the use of a different mode for each stream. The parse cycle size is thus further selected to include an integer number of puncture cycles for each of the M streams, so that puncturing can be properly performed for each stream. The parse cycle includes at least one puncture cycle for each of the M streams.

For clarity, parsing for a specific example is described below. For this example, M=4 and four streams are transmitted with the modes given in Table 3. In this example, the parse cycle includes a sufficient number of code bits from encoder 210 to generate two modulation symbols for each of the four streams. For stream 1, two puncture cycles for the rate 5/8 puncture pattern of "1110111011" are used to obtain 16 code bits for two 256-QAM modulation symbols. For stream 2, three puncture cycles for the rate 3/4 puncture pattern of "111001" are used to obtain 12 code bits for two 64-QAM modulation symbols. For stream 3, four puncture cycles for the rate 2/3 puncture pattern of "1110" are used to obtain 12 code bits for two 64-QAM modulation symbols. For stream 4, one puncture cycle for the rate 1/2 puncture pattern of "11" is used to obtain 2 code bits for two BPSK modulation symbols. The parse cycle includes 56 code bits from encoder 210.

TABLE 3

| Stream | Mod Scheme | Code Rate | # Code Bits before Puncturing | # Code Bits after Puncturing | # Puncture Cycles/Parse Cycle |
|---|---|---|---|---|---|
| 1 | 256-QAM | 5/8 | 20 | 16 | 2 |
| 2 | 64-QAM | 3/4 | 18 | 12 | 3 |
| 3 | 64-QAM | 2/3 | 16 | 12 | 4 |
| 4 | BPSK | 1/2 | 2 | 2 | 1 |

Figure 3A:
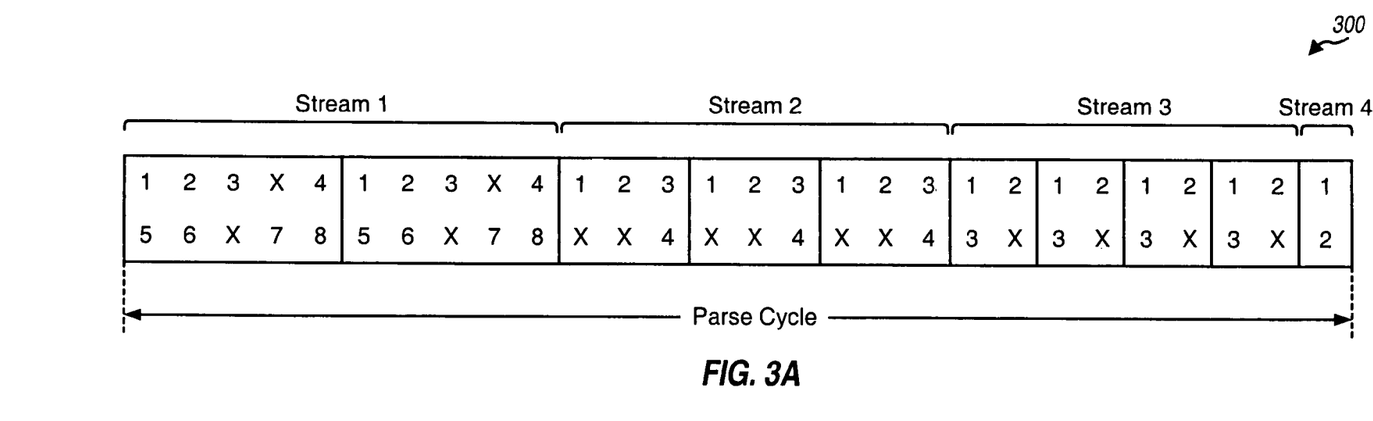
FIGS. 3A and 3B show two sequences of puncture cycles generated based on two different parsing schemes.

FIG. 3A shows a sequence of puncture cycles 300 generated based on stream index. For sequence 300, parser 220 provides the first 20 code bits in the parse cycle to stream 1, then the next 18 code bits to stream 2, then the next 16 code bits to stream 3, then the last 2 code bits in the parse cycle to stream 4. Sequence 300 is easy to generate but does not provide good mixing of code bits across the four streams since the puncture cycles, and hence the code bits, for each stream are next to each other in the parse cycle.

Improved mixing can be achieved by distributing the puncture cycles for each stream as evenly as possible across the parse cycle. The distribution of the puncture cycles across the parse cycle may be achieved in various manners. In the following description, various processes are first generically described for M streams with individually selectable modes and then specifically described for the example with four streams given in Table 3.

Figure 4:
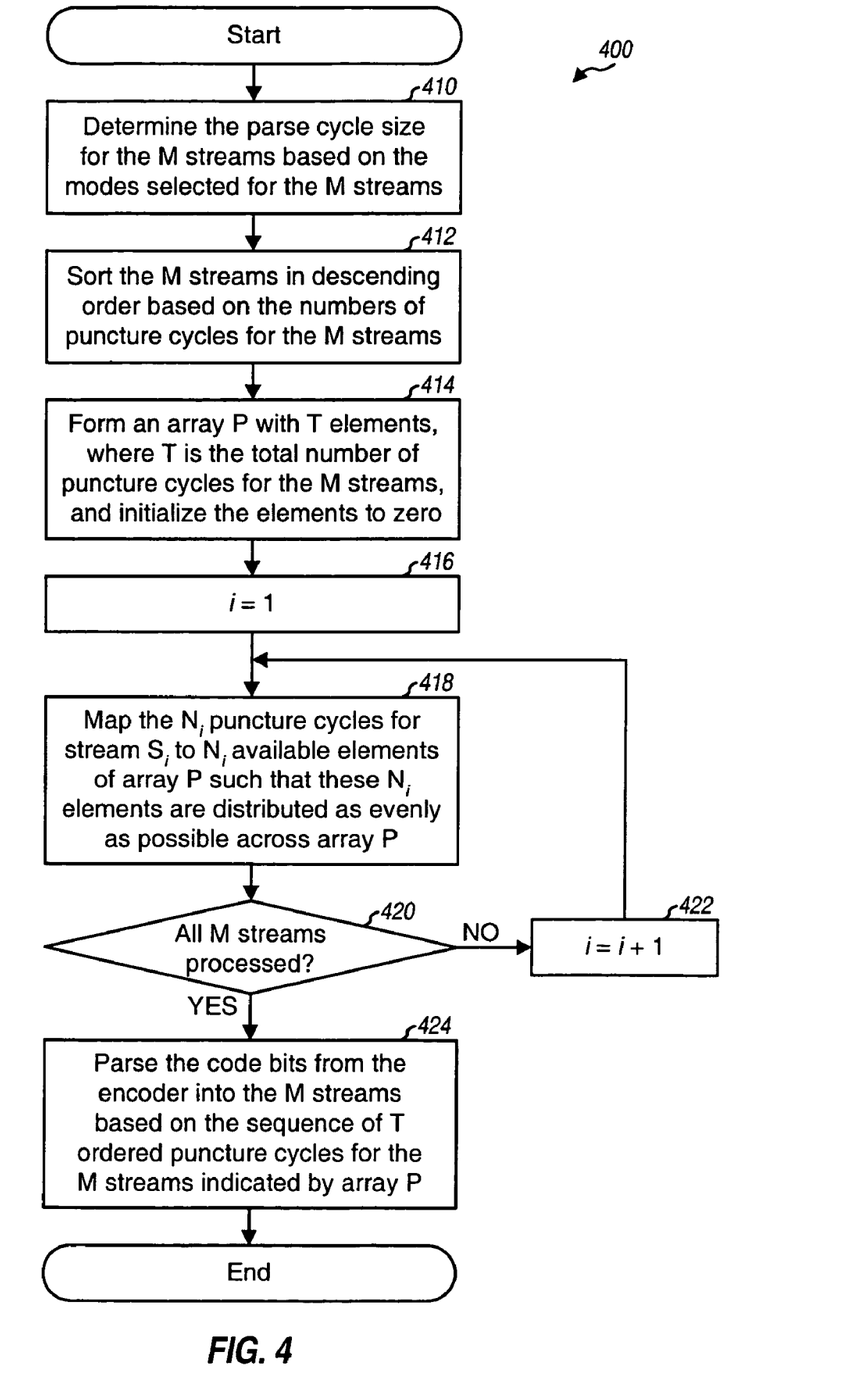
FIG. 4 shows a process for performing parsing with the puncture cycles for each stream evenly distributed across a parse cycle.

FIG. 4 shows a process 400 for performing parsing with the puncture cycles for each stream evenly distributed across the parse cycle. Initially, the parse cycle size for the M streams is determined based on the modes selected for the M streams (block 410). The mode selected for each stream indicates (1) the code rate for the stream, which determines the puncture pattern for the stream, and (2) the modulation scheme for the stream, which determines the number of code bits per modulation symbol (bits/sym). The parse cycle size may be determined as follows. First, the number of output code bits per puncture pattern (bits/pc) is determined for each stream by counting the number of ones ('1') in the puncture pattern for that stream, as shown in Table 2. The number of puncture cycles per modulation symbol (pc/sym) is next determined for each stream as an integer ratio of bits/sym over bits/pc. The pc/sym ratio for each stream is then reduced so that the denominator is as small an integer as possible. The lowest common denominator for the reduced pc/sym ratios for all M streams is next determined. The pc/sym ratio for each stream is then represented using the lowest common denominator. The numerators for the M ratios then indicate the numbers of puncture cycles for the M streams for one parse cycle. An example for determining the parse cycle is described below.

The M streams are then sorted based on the numbers of puncture cycles for each stream, e.g., in descending order from the stream with the most number of puncture cycles to the stream with the least number of puncture cycles (block 412). The M sorted streams are denoted as $S_1, S_2, \ldots, S_M$ and have $N_1, N_2, \ldots, N_M$ puncture cycles per parse cycle, respectively, where $N_1 \leq N_2 \leq \ldots \leq N_M$ after the sorting.

An array P with T elements is formed (block 414), where T is the total number of puncture cycles for all M streams in the parse cycle. T may be computed as follows:

$$T = \sum_{i=1}^{M} N_i. \qquad \text{Eq (1)}$$

The T elements of array P are initialized by setting each element to zero (also block 414). An index i is initialized to 1 for the first stream (block 416).

The $N_i$ puncture cycles for stream $S_i$ are then mapped to $N_i$ available elements of array P such that these $N_i$ elements are distributed as evenly as possible across array P (block 418). This mapping may be achieved in various manners, as described below. Each of the $N_i$ mapped elements corresponds to one puncture cycle for stream $S_i$. A determination is then made whether all M streams have been processed (block 420). If the answer is 'No', then index i is incremented (block 422), and the process returns to block 418 to process the next stream. Otherwise, if all M streams have been processed, then array P represents a sequence with the final ordering of the T puncture cycles for the M streams, where the $N_i$ puncture cycles for each stream $S_i$ are distributed as evenly as possible across the parse cycle/sequence. The code bits from encoder 210 are then parsed into the M streams based on the sequence of T ordered puncture cycles for the M streams, as described below (block 424). Process 400 then terminates.

Figure 5:
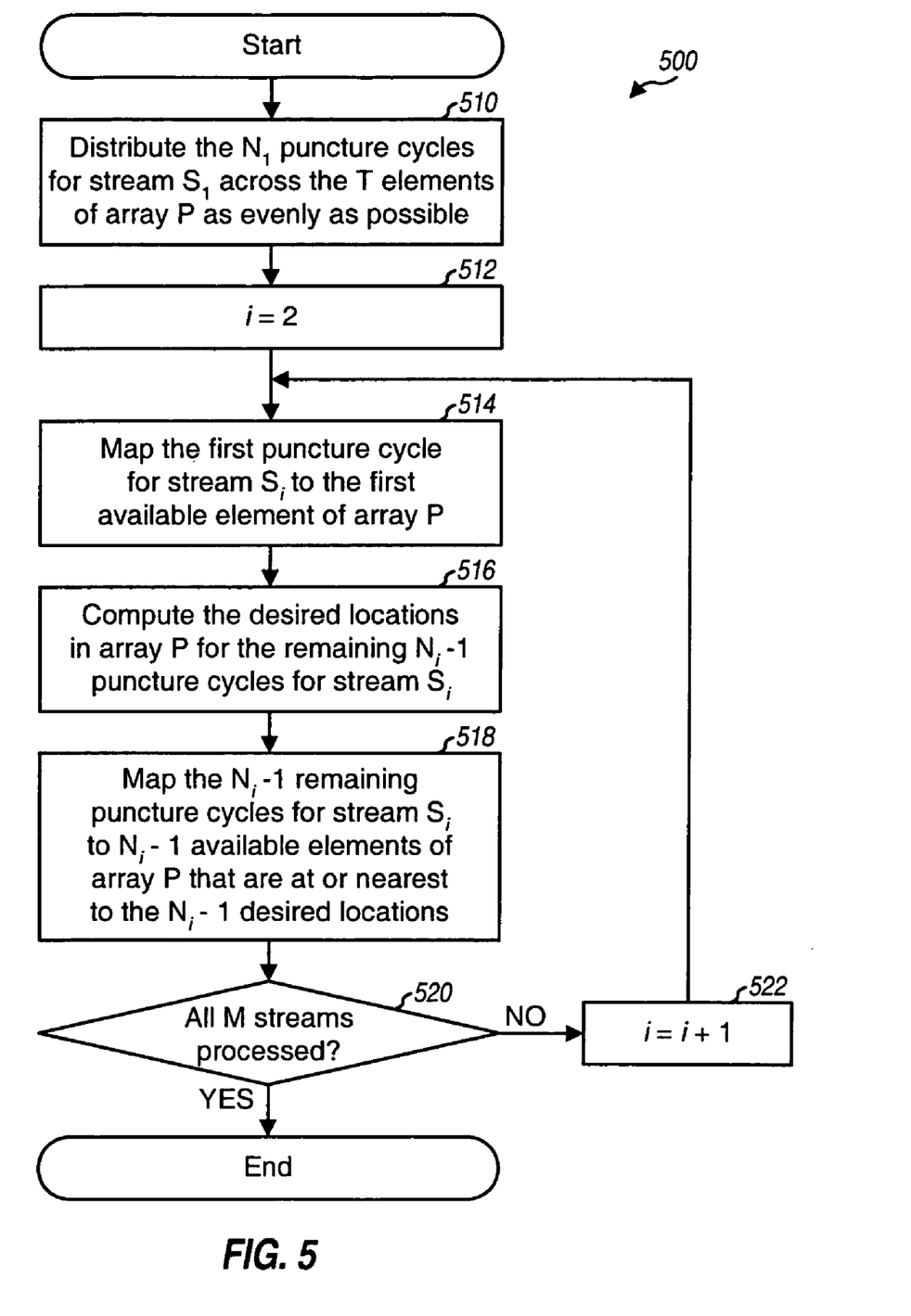
FIG. 5 shows an embodiment for forming a sequence of puncture cycles.

FIG. 5 shows a process 500 for forming a sequence of puncture cycles for M streams. Process 500 is one embodiment of block 416 through 422 in FIG. 4.

The $N_1$ puncture cycles for stream $S_1$ (which has the most number of puncture cycles) are first distributed across the T elements of array P as evenly as possible (block 510). This may be achieved by storing $S_1$ in $N_1$ array elements having indices computed as follows:

$$k_{S_1,j} = \text{round}\left(\frac{T \cdot j}{N_1}\right), \quad \text{Eq (2)}$$

for $j = 0, \ldots, N_1 - 1$, where $k_{s_{i,j}}$ is the index of the array element for the j-th puncture cycle of stream $S_i$. Values at exactly 1/2 may be rounded up in equation (2).

The $N_i$ puncture cycles for each of the M−1 remaining streams are then distributed across the T elements of array P as evenly as possible, one stream at a time and in descending order from streams $S_2$ through $S_M$. The index i is set to two for the next stream to process (block 512). The first puncture cycle for stream $S_i$ is mapped to the first available (or non-zero) element of array P (block 514). An available element is an array element that contains a zero and is not already storing a puncture cycle for a stream. The "desired" locations in array P for the remaining $N_i$−1 puncture cycles for stream $S_i$ may be computed (block 516), as follows:

$$k_{S_i,j} = k_{S_i,0} + \text{round}\left(\frac{T \cdot j}{N_i}\right), \quad \text{Eq (3)}$$

for $j = 1, \ldots, N_i - 1$, where $k_{s_i,0}$ is the index of the array element for the first puncture cycle of stream $S_i$; and $k_{s_{i,j}}$ is the desired location in array P for the j-th puncture cycle of stream $S_i$.

The $N_i$−1 puncture cycles for stream $S_i$ are then mapped to $N_i$−1 available elements of array P that are at or nearest to the $N_i$−1 desired locations (block 518). For each value of index j, where $j=1, \ldots, N_i-1$, the j-th puncture cycle for stream $S_i$ is stored in the $k_{s_{i,j}}$-th element of array P if this element is available. If this element is unavailable, then successive elements on both sides of this unavailable element are checked until an available element is found, and the j-th puncture cycle for stream $S_i$ is stored in this available element. The successive elements are identified by alternately incrementing and decrementing $k_{s_{i,j}}$ modulo T. For example, elements with indices $k_{s_{i,j}}$, $k_{s_{i,j}}+1$, $k_{s_{i,j}}+2$, and so on, are successively checked to see if they are available.

The final location for the j-th puncture cycle may be determined without ambiguity in integer arithmetic by performing an integer divide by $N_i$ and then adding one if the remainder is greater than or equal to $\lceil N_i/2 \rceil$, where $\lceil x \rceil$ is a ceiling operator that gives the next higher integer value for x. For example, if T=10 and $N_i$=3, then $\lceil N_i/2 \rceil$=2. For j=1, an integer divide of $T/N_i$=10/3 gives a quotient of 3 and a remainder of 1, which is less than $\lceil N_i/2 \rceil$=2 so the quotient 3 is provided as the desired location. For j=2, an integer divide of $2 \cdot T/N_i$=20/3 gives a quotient of 6 and a remainder of 12, which is equal to $\lceil N_i/2 \rceil$=2 so the quotient 6 plus one is provided as the desired location.

After block 518, a determination is made whether all M streams have been processed (block 520). If the answer is 'No', then index i is incremented (block 522), and the process returns to block 514 to process the next stream. Otherwise, process 500 terminates.

Process 500 is described below for the example with four streams given in Table 3. The parse cycle for the four streams is determined as follows. The modulation schemes for streams 1, 2, 3 and 4 have 8, 6, 6 and 1 bits/sym, respectively. The code rates for streams 1, 2, 3 and 4 are associated with puncture patterns that provide 8, 4, 3 and 2 bits/pc, respectively. Streams 1, 2, 3 and 4 thus have pc/sym ratios of 1, 3/2, 2 and 1/2, respectively. The lowest common denominator is 2 for the four pc/sym ratios. Streams 1, 2, 3 and 4 then have pc/sym ratios of 2/2, 3/2, 4/2 and 1/2, respectively, using the lowest common denominator, and thus have 2, 3, 4 and 1 puncture cycles per parse cycle, respectively.

The four streams are sorted in descending order based on the number of puncture cycles to obtain the following sorted order: streams 3, 2, 1 and 4. Stream 3 is denoted as $S_1$ (or $S_1$=3) and has $N_1$=4 puncture cycles. Stream 2 is denoted as $S_2$ (or $S_2$=2) and has $N_2$=3 puncture cycles. Stream 1 is denoted as $S_3$ (or $S_3$=1) and has $N_3$=2 puncture cycles. Stream 4 is denoted as $S_4$ (or $S_4$=4) and has $N_4$=1 puncture cycle. If two streams have the same number of puncture cycles, then the stream with lower index may be selected by the sorting. The sorting provides a permutation or mapping such that $N_1 \geq N_2 \geq N_3 \geq N_4$, or $N_i \geq N_l$ for i<l, where i∈{1, 2, 3, 4} and l∈{1, 2, 3, 4}. The sorting is further such that $S_i < S_l$ if $N_i = N_l$. The total number of puncture cycles for all four streams is computed as T=4+3+2+1=10. Array P contains 10 elements that are initialized to zeros.

The $N_1$=4 puncture cycles for stream $S_1$ are first distributed across the 10 elements of array P as evenly as possible. The indices of four elements of array P for the four puncture cycles of stream $S_1$ are computed as shown in equation (2) and yield k=0, 3, 5 and 8. The four elements with these indices are set to $S_1$.

The $N_2$=3 puncture cycles for stream $S_2$ are next distributed across the 10 elements of array P as evenly as possible. This is achieved by storing $S_2$ in the first available element of array P, which is the element with index k=1. The desired locations for the remaining two puncture cycles for stream $S_2$ are computed as shown in equation (3) and are at k=4 and 8. $S_2$ is stored in the element with index k=4 since this element is available. Since the element with index k=8 is unavailable, $S_2$ is stored in the element with index k=9 because this is the nearest available element to k=8.

The $N_3$=2 puncture cycles for stream $S_3$ are next distributed across the 10 elements of array P as evenly as possible. This is achieved by storing $S_3$ in the first available element of array P, which is the element with index k=2. The desired location for the remaining puncture cycle for stream $S_2$ is computed as shown in equation (3) and is at k=7. The element with index k=7 is set to $S_3$ since this element is available.

The $N_4$=1 puncture cycle for stream $S_4$ is then stored in array P at the single available element remaining in array P, which is the element with index k=6.

Figure 3B:
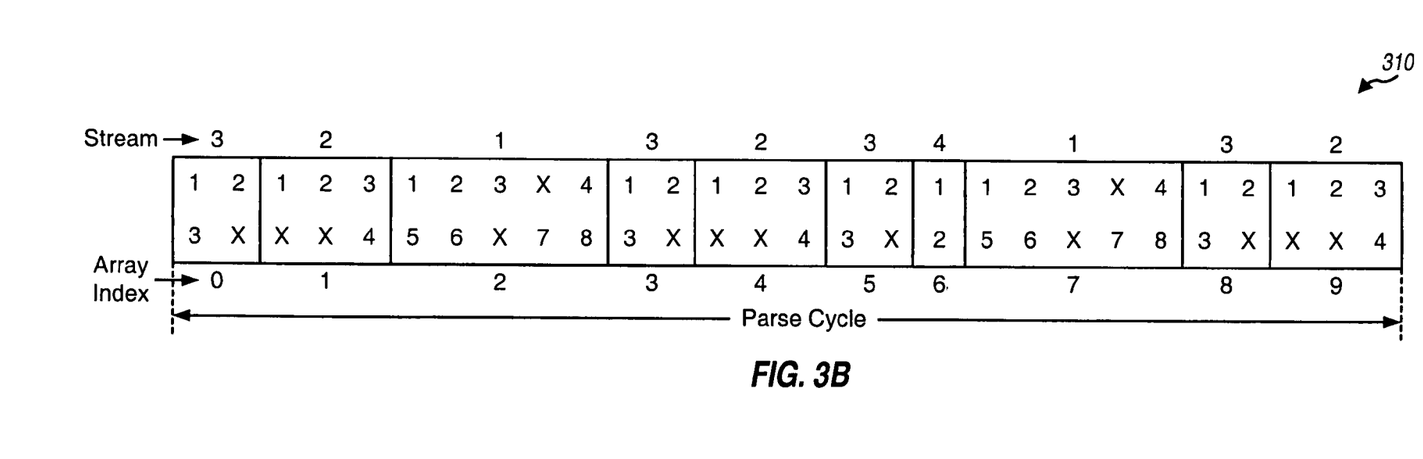

FIG. 3B shows a sequence of puncture cycles 310 generated based on process 500 in FIG. 5 for the example with four streams given in Table 3. Process 500 maps (1) the four puncture cycles for stream $S_1$ to four elements with indices k=0, 3, 5 and 8 in array P, (2) the three puncture cycles for stream $S_2$ to three elements with indices k=1, 4 and 9, (3) the two puncture cycles for stream $S_3$ to two elements with indices k=2 and 7, and (4) the single puncture cycle for stream $S_4$ to one element with index k=6.

For sequence 310, parser 220 provides the first 4 code bits in the parse cycle to stream 3, then the next 6 code bits to stream 2, then the next 10 code bits to stream 1, then the next 4 code bits to stream 3, and so on, and the last 4 code bits in the parse cycle to stream 2. Sequence 310 provides good mixing of the code bits from encoder 210 across the four streams since the puncture cycles for each stream are distributed approximately evenly across the parse cycle.

Figure 6:
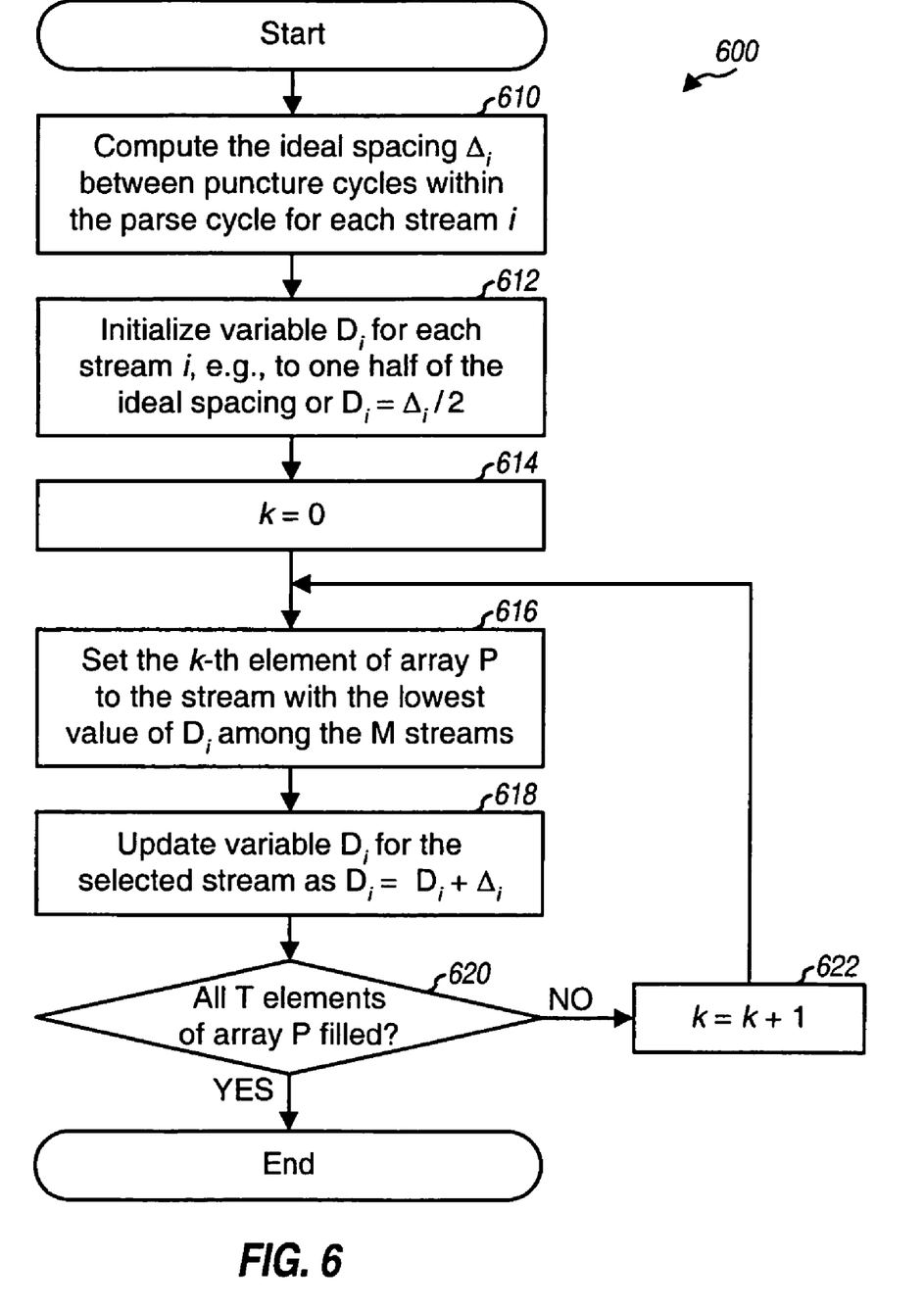
FIG. 6 shows another embodiment for forming a sequence of puncture cycles.

FIG. 6 shows a process 600 for forming a sequence of puncture cycles for M streams. Process 600 is another embodiment of block 412 through 422 in FIG. 4. For process 600, the ideal spacing between puncture cycles within the parse cycle for each stream i is first computed as $\Delta_i = T/N_i$, for $i=1, \ldots, M$ (block 610). A variable $D_i$ for each stream i is initialized to, e.g., one half of the ideal spacing for the stream, or $D_i = \Delta_i/2$ for $i=1, \ldots, M$ (block 612). An index k for the T elements of array P is initialized to zero (block 614).

For each value of index k, the k-th element of array P is set to the stream with the lowest value of $D_i$ among the M streams (block 616). The variable $D_i$ for the selected stream is then updated by adding $\Delta_i$ to the variable, or $D_i = D_i + \Delta_i$ (block 618). A determination is then made whether all T elements of array P have been filled (block 620). If the answer is 'No', then index k is incremented (block 622), and the process returns to block 616 to fill the next element of array P. Otherwise, process 600 terminates.

Process 600 is described below for the example with four streams given in Table 3. The ideal spacing between puncture cycles for each stream i is computed as: $\Delta_1 = 5$, $\Delta_2 = 10/3$, $\Delta_3 = 10/4$, and $\Delta_4 = 10$. The variables $D_i$ for the four streams may be initialized as: $D_1 = 5/2$, $D_2 = 5/3$, $D_3 = 5/4$, and $D_4 = 5$.

Table 4 shows the result of the processing for each value of index k. For k=0, stream 3 has the smallest $D_i$ value among the four streams, which is $D_3 = 5/4$, the element with index 0 is set to stream 3, or P(0)=3, and $D_3$ is updated as $D_3 = 5/4 + 512 = 15/4$. For k=1, stream 2 has the smallest $D_i$ value among the four streams, which is $D_2 = 5/3$, the element with index 1 is set to stream 2, or P(1)=2, and $D_2$ is updated as $D_2 = 5/3 + 10/3 = 5$. For k=2, stream 1 has the smallest $D_i$ value among the four streams, which is $D_1 = 5/2$, the element with index 2 is set to stream 1, or P(2)=1, and $D_1$ is updated as $D_2 = 5/2 + 5 = 15/2$. The processing for each remaining value of index k is performed in similar manner. For each value of index k, the stream with the smallest $D_i$ value is highlighted by grey shading in Table 4 and is also selected for the k-th element of array P. If two elements have the same $D_i$ value, which is the case for k=4 in Table 4, then the stream with the smaller index i may be selected first.

TABLE 4

| Stream | 1 | 2 | 3 | 4 | |
|---|---|---|---|---|---|
| $\Delta_i$ | 5 | 3 1/3 | 2 1/2 | 10 | |
| | $D_1$ | $D_2$ | $D_3$ | $D_4$ | P(k) |
| k = 0 | 2 1/2 | 1 2/3 | 1 1/4 | 5 | 3 |
| k = 1 | 2 1/2 | 1 2/3 | 3 3/4 | 5 | 2 |
| k = 2 | 2 1/2 | 5 | 3 3/4 | 5 | 1 |
| k = 3 | 7 1/2 | 5 | 3 3/4 | 5 | 3 |
| k = 4 | 7 1/2 | 5 | 6 1/4 | 5 | 2 |
| k = 5 | 7 1/2 | 8 1/3 | 6 1/4 | 5 | 4 |
| k = 6 | 7 1/2 | 8 1/3 | 6 1/4 | 15 | 3 |
| k = 7 | 7 1/2 | 8 1/3 | 8 3/4 | 15 | 1 |
| k = 8 | 12 1/2 | 8 1/3 | 8 3/4 | 15 | 2 |
| k = 9 | 12 1/2 | 11 2/3 | 8 3/4 | 15 | 3 |

Different sequences of puncture cycles with different orderings of puncture cycles may be achieved by initializing the variable $D_i$ in different manners. For example, the variable $D_i$ for the stream with the most number of puncture cycles and hence the smallest ideal spacing may be initialized to zero to give this stream more weight in distributing its puncture cycles evenly across the parse cycle. If variable $D_3$ for stream 3 is initialized to zero in Table 4, then process 600 would generate the following sequence of puncture cycles: 3, 2, 1, 3, 2, 3, 4, 1, 3, 2.

FIGS. 5 and 6 show two embodiments for generating sequences of puncture cycles such that the puncture cycles for each of the M streams are distributed as evenly as possible across the parse cycle. The puncture cycles may also be distributed evenly or approximately evenly in other manners, and this is within the scope of the invention. Parser 220 distributes the code bits from encoder 210 to the M streams, one puncture cycle at a time, based on the ordering of the T puncture cycles within the parse cycle, e.g., as shown in FIG. 3B. This parsing per puncture cycle typically provides good performance since puncturing is often designed for consecutive code bits from encoder 210.

Parser 220 may also distribute the code bits from encoder 210 to the M streams, one code bit at a time, based on a specific ordering of the code bits within the parse cycle. For example, process 600 in FIG. 6 may be implemented with $N_i$ representing the number of code bits for stream i prior to puncturing, instead of the number of puncture cycles for stream i. Array P would then include $T_{bit}$ elements for $T_{bit}$ input code bits in the T puncture cycles for the M streams. Each element of array P is filled with one of the M streams by process 600. Parser 220 then distributes the code bits from encoder 210 to the M streams based on the ordering given in array P.

For the example with four streams shown in Table 3, the number of code bits prior to puncturing for each stream is given in the fourth column, which is $N_{bit,1} = 20$, $N_{bit,2} = 18$, $N_{bit,3} = 16$, and $N_{bit,4} = 2$. The total number of code bits per parse cycle is $T_{bit} = 56$. The ideal spacing between code bits for each stream i is computed as $\Delta_{bit,i} = T_{bit}/N_{bit,i}$. Variable $D_{bit,i}$ for each stream i may be initialized to one half of the ideal spacing, or $D_{bit,i} = \Delta_{bit,i}/2$. Each of the $T_{bit}$ elements of array P is then filled with one of the M streams, e.g., similar to the processing shown in Table 4. Array P then represents a sequence of $T_{bit}$ ordered code bits for the parse cycle. Parser 220 then provides the first code bit in the parse cycle to the stream indicated by the first element of array P, the second code bit to the stream indicated by the second element of array P, and so on. Parsing on a per code bit basis (instead of per puncture cycle basis) may provide good performance under certain circumstances (e.g., if the same code rate is used for all streams).

Receiving entity 150 performs reassembly of M received streams in a manner complementary to the parsing performed by transmitting entity 110. The processing by receiving entity 150 is also dependent on, and complementary to, the processing performed by transmitting entity 110.

Figure 7:
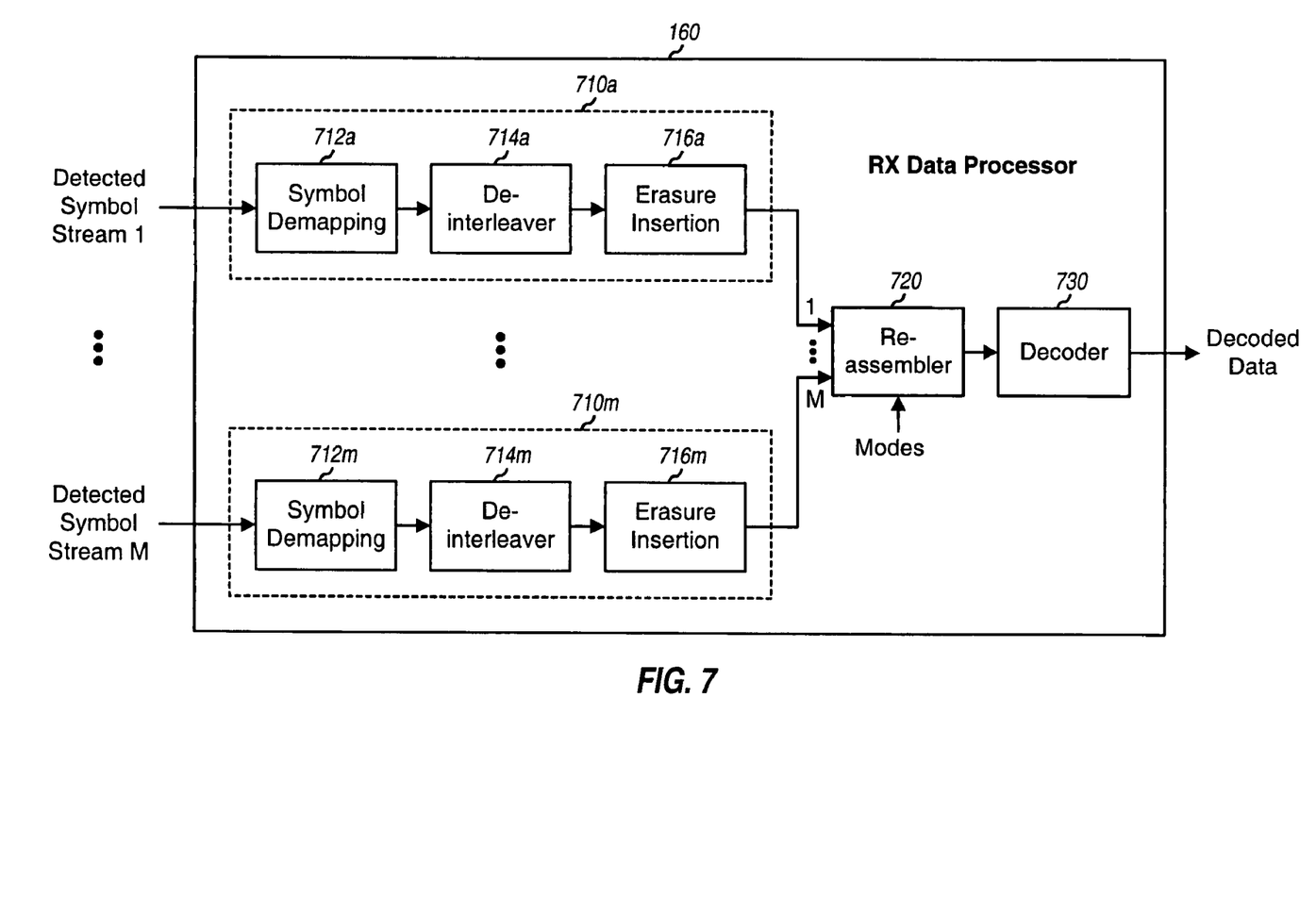
FIG. 7 shows a receive (RX) data processor at the receiving entity.

FIG. 7 shows a block diagram of an embodiment of RX data processor 160 at receiving entity 150. Within RX data processor 160, M stream processors 710a through 710m are provided with M detected symbol streams from RX spatial processor 156.

Each stream processor 710 includes a symbol demapping unit 712, a deinterleaver 714, and an erasure insertion unit 716. Symbol demapping unit 712 generates log-likelihood ratios (LLRs) or some other representations for the code bits of the detected symbols. The LLR for each code bit indicates the likelihood of the code bit being a one ('1') or a zero ('0'). Deinterleaver 714 deinterleaves the LLRs for the code bits in a manner complementary to the interleaving performed by interleaver 234 at transmitting entity 110. Erasure insertion unit 716 inserts erasures for the code bits punctured by puncturing unit 232 at transmitting entity 110. An erasure is an LLR value of 0 and indicates equal likelihood of a punctured code bit being a zero ('0') or a one ('1') since no information is known for the punctured code bit, which is not transmitted.

A reassembly unit 720 receives the outputs from M stream processors 710a through 710m for the M streams, reassembles or multiplexes these outputs into one composite stream in a manner complementary to the parsing performed by parser 220 at transmitting entity 110, and provides the composite stream to a decoder 730. Decoder 730 decodes the LLRs in the composite stream in a manner complementary to the encoding performed by encoder 210 at transmitting entity 110 and provides decoded data. Decoder 730 may implement a Viterbi decoder if encoder 210 is a convolutional encoder.

For clarity, the parsing techniques have been described for a rate 1/2 binary convolutional code. These techniques may also be used for various other codes such as a Turbo code, an LDPC code, a block code, and so on.

The parsing techniques have also been described for a MIMO system. These techniques may also be used in other communication systems capable of transmitting multiple streams via multiple transmission channels. A transmission channel may be a spatial channel in a MIMO system, a set of subbands in an OFDM system, a spatial channel for a set of subbands in a MIMO-OFDM system, a code channel, and so on.

The parsing techniques may be implemented by various means. For example, these techniques may be implemented in hardware, software, or a combination thereof. For a hardware implementation, the processing units used to perform parsing at the transmitting entity may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to perform the complementary reassembly at the receiving entity may also be implemented within one or more ASICs, DSPs, and so on.

For a software implementation, the parsing techniques may be implemented with modules (e.g., procedures, functions, and so on) that perform the functions described herein. The software codes may be stored in a memory unit (e.g., memory unit 132 or 172 in FIG. 1) and executed by a processor (e.g., controller 130 or 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of parsing code bits in a communication system, comprising:
   forming, by a transmit processor of a transmitter, a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
   parsing, by the transmit processor, code bits into the plurality of streams based on the T ordered puncture cycles.

2. The method of claim 1, wherein determining a number of puncture cycles for each stream comprises:
   determining a number of puncture cycles in a parse cycle for each stream based on modulation schemes and puncture patterns used for the plurality of streams.

3. The method of claim 1, wherein the forming the sequence of puncture cycles comprises
   ordering the plurality of streams in descending order based on the number of puncture cycles determined for each of the plurality of streams, and
   distributing one or more puncture cycles for each of the plurality of ordered streams evenly or approximately evenly across the sequence of puncture cycles.

4. The method of claim 3, wherein the distributing the one or more puncture cycles for each of the plurality of ordered streams comprises
   distributing the puncture cycles for a stream with most number of puncture cycles evenly or approximately evenly across the sequence of puncture cycles, and
   for each remaining stream in the plurality of streams,
      mapping a first puncture cycle for the stream in a first available location within the sequence,
      determining desired locations for remaining puncture cycles, if any, for the stream, and
      mapping the remaining puncture cycles, if any, to available locations in the sequence that are at or closest to the desired locations.

5. The method of claim 1, wherein the forming the sequence of puncture cycles comprises
   determining spacing between puncture cycles for each of the plurality of streams, and
   distributing a plurality of puncture cycles for the plurality of streams based on the spacing between puncture cycles for each stream.

6. The method of claim 5, wherein the distributing the plurality of puncture cycles for the plurality of streams comprises
   initializing a variable for the each stream based on the spacing for the stream, and
   for each location in the sequence of puncture cycles,
      identifying a stream with a smallest value for the variable among the plurality of streams,
      filling the location in the sequence with a puncture cycle for the identified stream, and
      updating the variable for the identified stream based on the spacing for the identified stream.

7. The method of claim 1, further comprising:
   encoding traffic data in accordance with a rate ½ convolutional code to generate the code bits.

8. The method of claim 1, further comprising:
   selecting a mode for each of the plurality of streams, the mode for each stream indicating a code rate and a modulation scheme to use for the stream, wherein different modes are selectable for the plurality of streams.

9. The method of claim 1, further comprising:
   puncturing the code bits in the each stream based on a puncture pattern for the stream.

10. The method of claim 1, further comprising:
    processing the plurality of streams for transmission via a plurality of spatial channels.

11. A transmitter for use in a communication system, comprising:
- a controller operative to form a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
- a parser operative to parse code bits into the plurality of streams based on the T ordered puncture cycles.

12. The transmitter of claim 11, wherein the controller is further operative to order the plurality of streams in descending order based on the number of puncture cycles determined for the each stream, and to distribute one or more puncture cycles for the each stream evenly or approximately evenly across the sequence of puncture cycles.

13. The transmitter of claim 11, wherein the controller is further operative to determine spacing between puncture cycles for each of the plurality of streams, and to distribute a plurality of puncture cycles for the plurality of streams based on the spacing between puncture cycles for each stream.

14. The transmitter of claim 11, further comprising:
- an encoder operative to encode traffic data to generate the code bits.

15. The transmitter of claim 11, wherein the controller is operative to select a mode for each of the plurality of streams, the mode for the each stream indicating a code rate and a modulation scheme to use for the stream, wherein different modes are selectable for the plurality of streams.

16. A transmitter for use in a communication system, comprising:
- means for forming a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
- means for parsing code bits into the plurality of streams based on the T ordered puncture cycles.

17. The transmitter of claim 16, wherein the means for forming the sequence of puncture cycles comprises
- means for ordering the plurality of streams in descending order based on the number of puncture cycles determined for each of the plurality of streams, and
- means for distributing one or more puncture cycles for each of the plurality of ordered streams evenly or approximately evenly across the sequence of puncture cycles.

18. The transmitter of claim 16, wherein the means for forming the sequence of puncture cycles comprises
- means for determining spacing between the puncture cycles for each of the plurality of streams, and
- means for distributing a plurality of puncture cycles for the plurality of streams based on the spacing between the puncture cycles for the each stream.

19. The transmitter of claim 16, further comprising:
means for encoding traffic data to generate the code bits.

20. The transmitter of claim 16, further comprising:
means for selecting a mode for each of the plurality of streams, the mode for the each stream indicating a code rate and a modulation scheme to use for the stream, wherein different modes are selectable for the plurality of streams.

21. A method of reassembling symbols in a communication system, comprising:
- forming, by a receive processor of a receiver, a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
- reassembling, by the receive processor, symbols in a plurality of input streams based on the T ordered puncture cycles to form an output stream of symbols.

22. The method of claim 21, wherein the forming the sequence of puncture cycles comprises
- ordering the plurality of streams in descending order based on the number of puncture cycles determined for each of the plurality of streams, and
- distributing one or more puncture cycles for each of the plurality of ordered streams evenly or approximately evenly across the sequence of puncture cycles.

23. The method of claim 21, wherein the forming the sequence of puncture cycles comprises
- determining spacing between the puncture cycles for each of the plurality of streams, and
- distributing a plurality of puncture cycles for the plurality of streams based on the spacing between the puncture cycles for the each stream.

24. The method of claim 21, further comprising:
inserting erasures in each input stream based on a puncture pattern for the input stream.

25. The method of claim 21, further comprising:
decoding the output stream of symbols in accordance with a convolutional code to obtain decoded data.

26. A receiver for use in a communication system, comprising:
- a controller operative to form a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
- an RX data processor operative to reassemble symbols in a plurality of input streams based on the T ordered puncture cycles to form an output stream of symbols.

27. The receiver of claim 26, wherein the controller is operative to order the plurality of streams in descending order based on the number of puncture cycles determined for each of the plurality of streams, and to distribute one or more puncture cycles for each stream evenly or approximately evenly across the sequence of puncture cycles.

28. The receiver of claim 26, wherein the controller is operative to determine spacing between the puncture cycles for each of the plurality of streams, and to distribute a plurality of puncture cycles for the plurality of streams based on the spacing between the puncture cycles for the each stream.

29. The receiver of claim 26, wherein:
the RX data processor is further operative to insert erasures in each input stream based on a puncture pattern for the input stream.

30. A receiver for use in a communication system, comprising:
means for forming a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
means for reassembling symbols in a plurality of input streams based on the T ordered puncture cycles to form an output stream of symbols.

31. The receiver of claim 30, further comprising:
means for inserting erasures in each input stream based on a puncture pattern for the input stream.

32. The receiver of claim 30, further comprising:
means for decoding the output stream of symbols in accordance with a rate ½ convolutional code to obtain decoded data.

33. A memory unit having software codes stored thereon for parsing code bits in a communication system, the software codes being executable by one or more processors and the software codes comprising:
software codes for forming a sequence of puncture cycles for a plurality of streams such that, for each stream with multiple puncture cycles, the multiple puncture cycles for the stream are distributed evenly or approximately evenly across the sequence of puncture cycles by determining a number of puncture cycles for each stream, determining a total number T of puncture cycles for the plurality of streams by summing the number of puncture cycles for each stream, and ordering the T puncture cycles; and
software codes for parsing code bits into the plurality of streams based on the T ordered puncture cycles.

34. The memory unit of claim 33, wherein determining a number of puncture cycles for each stream:
determining a number of puncture cycles in a parse cycle for each of the plurality of streams based on modulation schemes and puncture patterns used for the plurality of streams.

35. The memory unit of claim 33, wherein the software codes for forming the sequence of puncture cycles comprises
software codes for ordering the plurality of streams in descending order based on the number of puncture cycles determined for each of the plurality of streams, and
software codes for distributing one or more puncture cycles for each of the plurality of ordered streams evenly or approximately evenly across the sequence of puncture cycles.

36. The memory unit of claim 35, wherein the software codes for distributing the one or more puncture cycles for each of the plurality of ordered streams comprises
software codes for distributing the puncture cycles for a stream with most number of puncture cycles evenly or approximately evenly across the sequence of puncture cycles, and
for each remaining stream in the plurality of streams,
software codes for mapping a first puncture cycle for the stream in a first available location within the sequence,
software codes for determining desired locations for remaining puncture cycles, if any, for the stream, and
software codes for mapping the remaining puncture cycles, if any, to available locations in the sequence that are at or closest to the desired locations.

37. The memory unit of claim 33, wherein the software codes for forming the sequence of puncture cycles comprises
software codes for determining spacing between puncture cycles for each of the plurality of streams, and
software codes for distributing a plurality of puncture cycles for the plurality of streams based on the spacing between puncture cycles for each stream.

38. The memory unit of claim 37, wherein the software codes for distributing the plurality of puncture cycles for the plurality of streams comprises
software codes for initializing a variable for the each stream based on the spacing for the stream, and
for each location in the sequence of puncture cycles,
software codes for identifying a stream with a smallest value for the variable among the plurality of streams,
software codes for filling the location in the sequence with a puncture cycle for the identified stream, and
software codes for updating the variable for the identified stream based on the spacing for the identified stream.

39. The memory unit of claim 33, further comprising:
software codes for encoding traffic data in accordance with a rate ½ convolutional code to generate the code bits.

40. The memory unit of claim 36, further comprising:
software codes for selecting a mode for each of the plurality of streams, the mode for each stream indicating a code rate and a modulation scheme to use for the stream, wherein different modes are selectable for the plurality of streams.

41. The memory unit of claim 33, further comprising:
software codes for puncturing the code bits in the each stream based on a puncture pattern for the stream.

42. The memory unit of claim 33, further comprising:
software codes for processing the plurality of streams for transmission via a plurality of spatial channels.

* * * * *